US006388959B1

(12) United States Patent
Kondo

(10) Patent No.: US 6,388,959 B1
(45) Date of Patent: May 14, 2002

(54) RECORDING AND REPRODUCTION APPARATUS, REPRODUCTION APPARATUS, RECORDING AND REPRODUCTION METHOD, AND REPRODUCTION METHOD

(75) Inventor: Tadaharu Kondo, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/574,883

(22) Filed: May 19, 2000

(30) Foreign Application Priority Data

May 28, 1999 (JP) .......................................... 11-149700

(51) Int. Cl.[7] .............................................. G11B 17/22
(52) U.S. Cl. ..................... 369/30.19; 369/84; 369/30.05
(58) Field of Search ........................... 369/30.05, 30.06, 369/30.19, 30.2, 30.21, 30.22, 84, 83; 360/15, 13

(56) References Cited

U.S. PATENT DOCUMENTS

| | | | | |
|---|---|---|---|---|
| 5,301,181 A | * | 4/1994 | Shiba et al. ................... | 369/84 |
| 5,311,492 A | * | 5/1994 | Tabuchi et al. ............... | 369/47 |
| 5,414,688 A | * | 5/1995 | Inokuchi ...................... | 369/84 |
| 5,453,968 A | * | 9/1995 | Veldhuis et al. .............. | 369/84 |
| 5,461,597 A | * | 10/1995 | Amano ......................... | 369/32 |
| 5,485,443 A | * | 1/1996 | Niwayama .................... | 369/54 |
| 5,610,893 A | * | 3/1997 | Soga et al. .................... | 369/84 |
| 5,625,610 A | * | 4/1997 | Hiranuma ..................... | 369/47 |
| 5,732,059 A | * | 3/1998 | Katsuyama et al. .......... | 369/84 |
| 5,751,678 A | * | 5/1998 | Tanaka ......................... | 369/84 |
| 5,862,104 A | * | 1/1999 | Matsumoto ................... | 369/7 |
| 5,963,521 A | * | 10/1999 | Nagashima et al. .......... | 369/54 |
| 5,974,018 A | * | 10/1999 | Takenaka ..................... | 369/84 |
| 6,137,642 A | * | 10/2000 | Inoue ........................... | 369/84 |

* cited by examiner

Primary Examiner—Tan Dinh
(74) Attorney, Agent, or Firm—Oblon, Spivak, McClelland, Maier & Neustadt, P.C.

(57) ABSTRACT

The invention provides a recording and reproduction apparatus which reduces interpolation noise of reproduced information and can produce a recording medium on which information of higher quality is recorded. The apparatus is adapted to read out information from a disk-type first recording medium and record the information onto a second recording medium, and includes a driving section for driving the first recording medium to rotate at a first speed, a reproduction head for reading out the information from the first recording medium, a feeding section for feeding the reproduction head to read out the information from a designated position of the first recording medium, an error detection section for detecting an error of the read out information, a feeding control section for controlling the feeding section so that, when an error is detected, the reproduction head may be fed to a reproduction position preceding to a reproduction position of the first recording medium at which the error is detected, and a driving control section for controlling the driving section so that, after the reproduction head is fed to the preceding reproduction position, the first recording medium may be rotated at a second speed lower than the first speed.

25 Claims, 7 Drawing Sheets

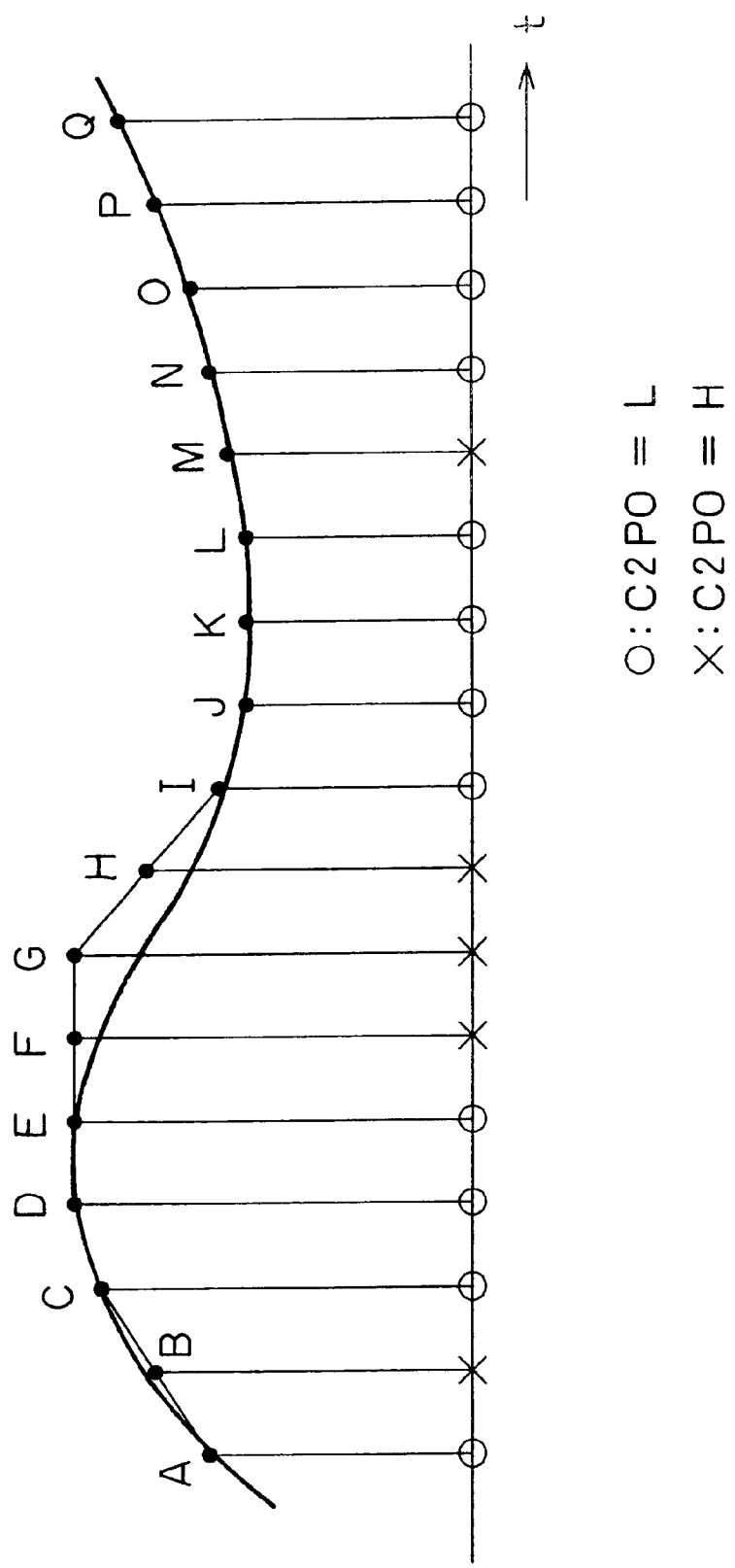

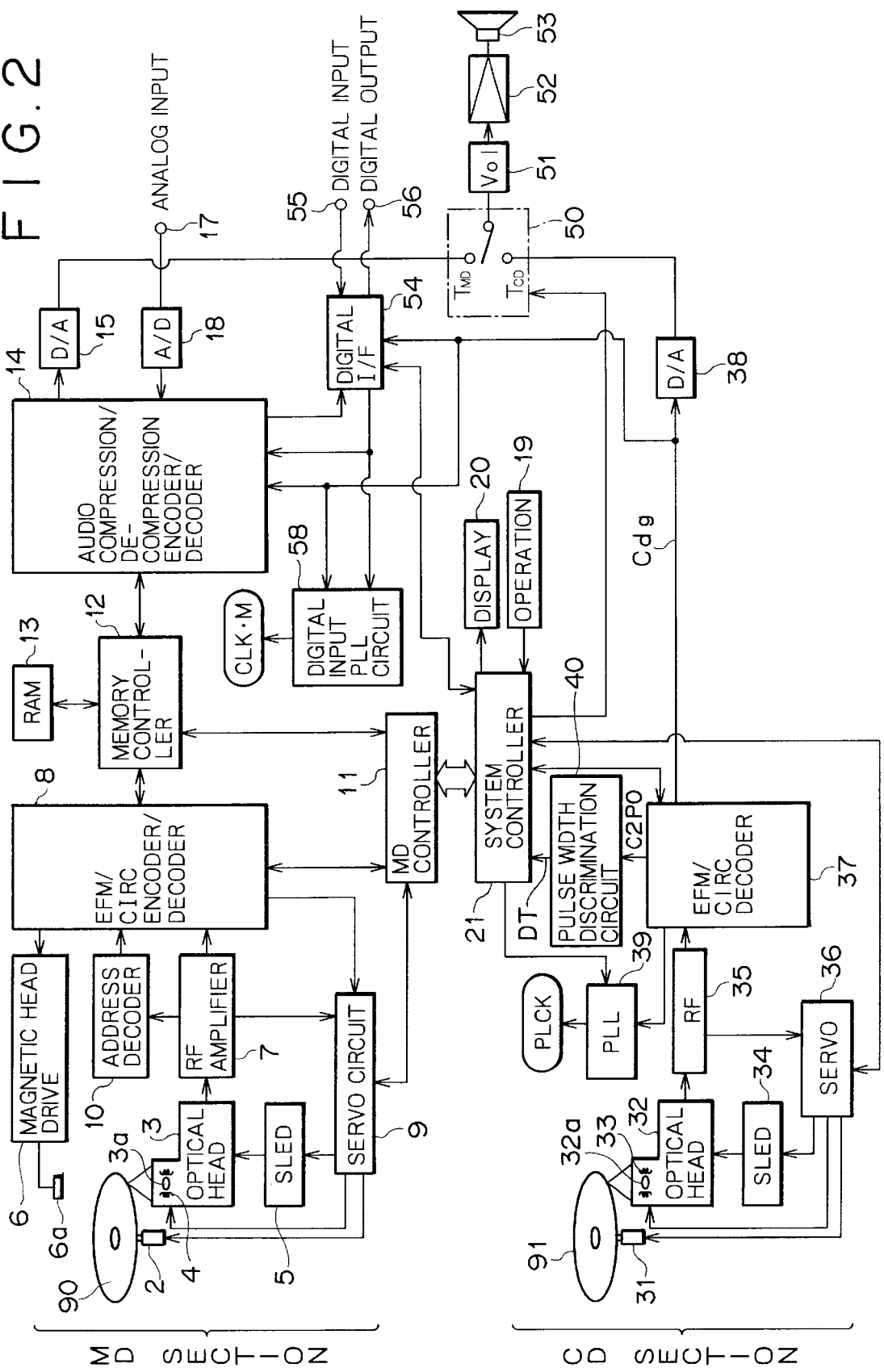

FIG. 4

| | ←—— 16 bit ——→ | | ←—— 16 bit ——→ | | |
|---|---|---|---|---|---|
| | MSB       LSB | MSB       LSB | MSB       LSB | MSB       LSB | |
| HEADER | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | Cluster H | Cluster L | Sector | 00000010 | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | Maker code | Model code | First TNO | Last TNO | 7 |
| | 00000000 | 00000000 | 00000000 | Used Sectors | 8 |
| CTID OANA RBDT RLIA EEC S AS P TE O IC N OT D NI E O N C E | 00000000 | 00000000 | 00000000 | 00000000 | 9 |
| | 00000000 | 00000000 | 00000000 | Disc Serial No. | 10 |
| | Disc | ID | P-DFA | P-EMPTY | 11 |
| | P-FRA | P-TNO1 | P-TNO2 | P-TNO3 | 12 |
| | P-TNO4 | P-TNO5 | P-TNO6 | P-TNO7 | 13 |
| | P-TNO248 | P-TNO249 | P-TNO250 | P-TNO251 | 74 |
| | P-TNO252 | P-TNO253 | P-TNO254 | P-TNO255 | 75 |
| | 00000000 | 00000000 | 00000000 | 00000000 | 76 |
| | 00000000 | 00000000 | 00000000 | 00000000 | 77 |
| MT AA(2 NB 5 AL 5 GE E S EMS L ENO NC T TI S) ION | (01h) START ADDRESS | | | TRACK MODE | 78 |
| | END ADDRESS | | | LINK INFORMATION | 79 |
| | (02h) START ADDRESS | | | TRACK MODE | 80 |
| | END ADDRESS | | | LINK INFORMATION | 81 |
| | (03h) START ADDRESS | | | TRACK MODE | 82 |
| | END ADDRESS | | | LINK INFORMATION | 83 |
| | (FCh) START ADDRESS | | | TRACK MODE | 580 |
| | END ADDRESS | | | LINK INFORMATION | 581 |
| | (FDh) START ADDRESS | | | TRACK MODE | 582 |
| | END ADDRESS | | | LINK INFORMATION | 583 |
| | (FEh) START ADDRESS | | | TRACK MODE | 584 |
| | END ADDRESS | | | LINK INFORMATION | 585 |
| | (FFh) START ADDRESS | | | TRACK MODE | 586 |
| | END ADDRESS | | | LINK INFORMATION | 587 |

U-TOC SECTOR 0

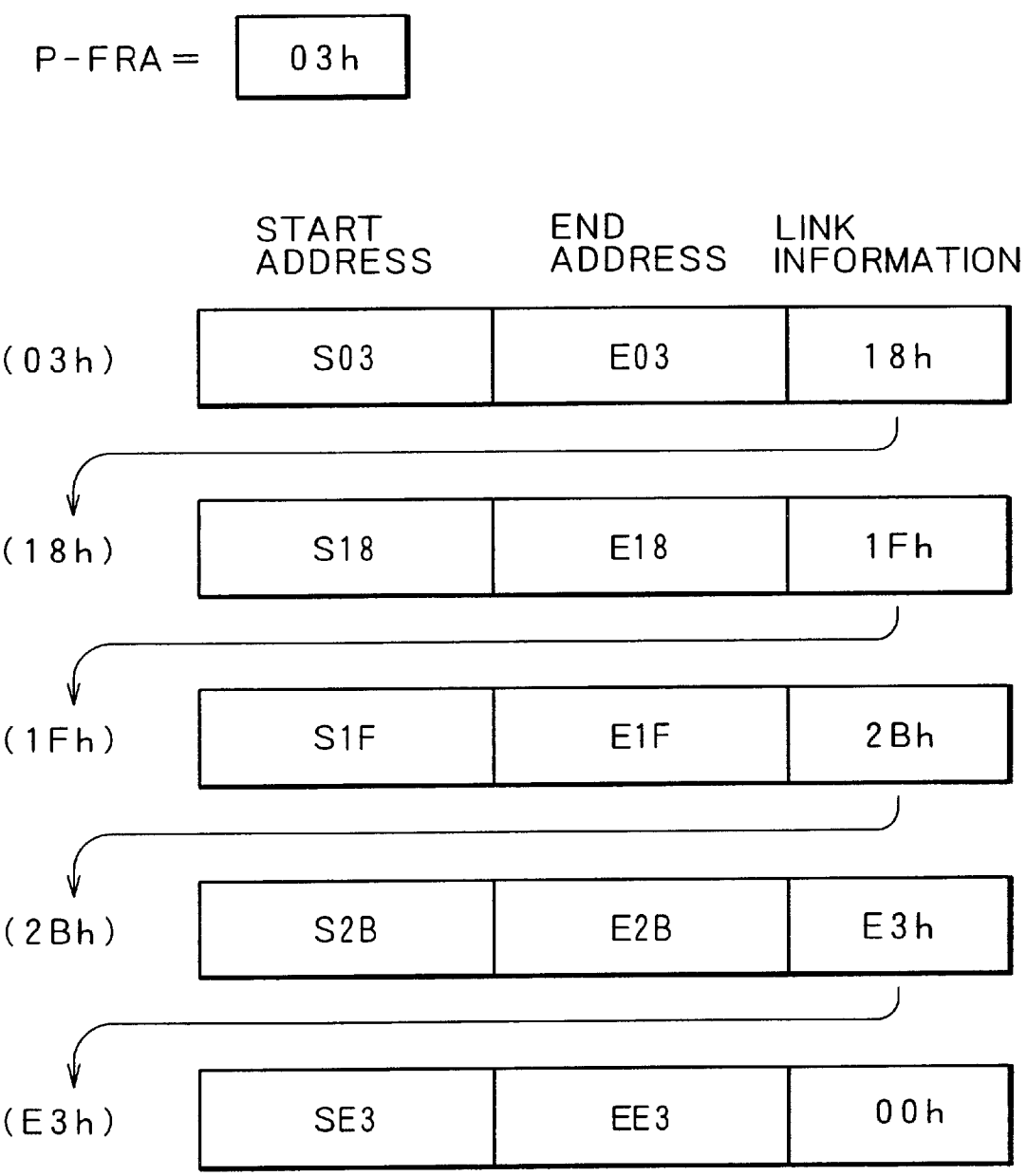

FIG. 6
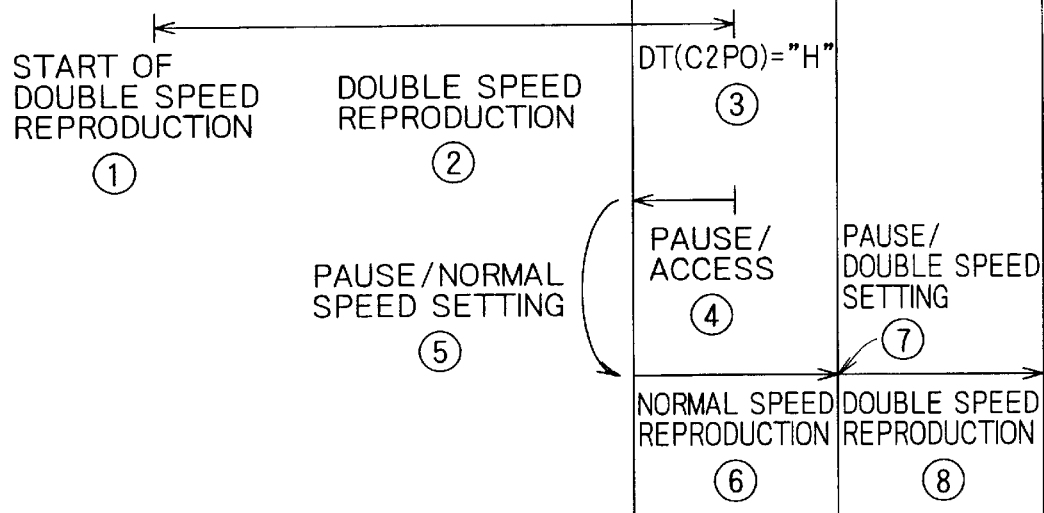
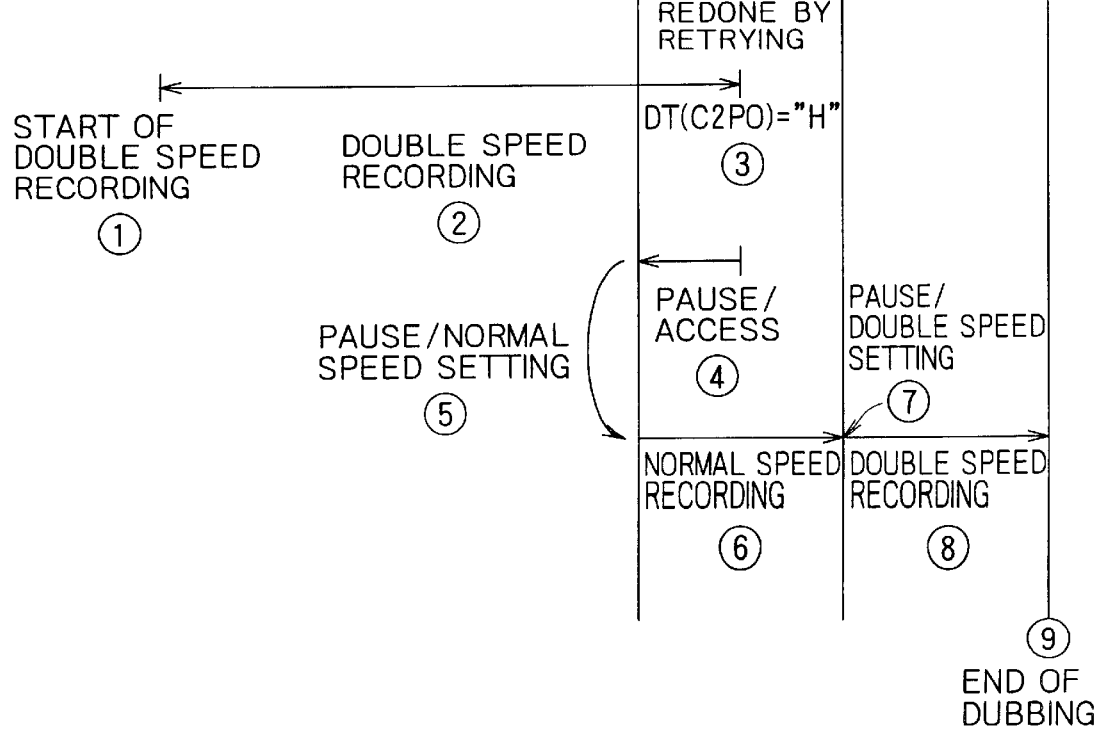

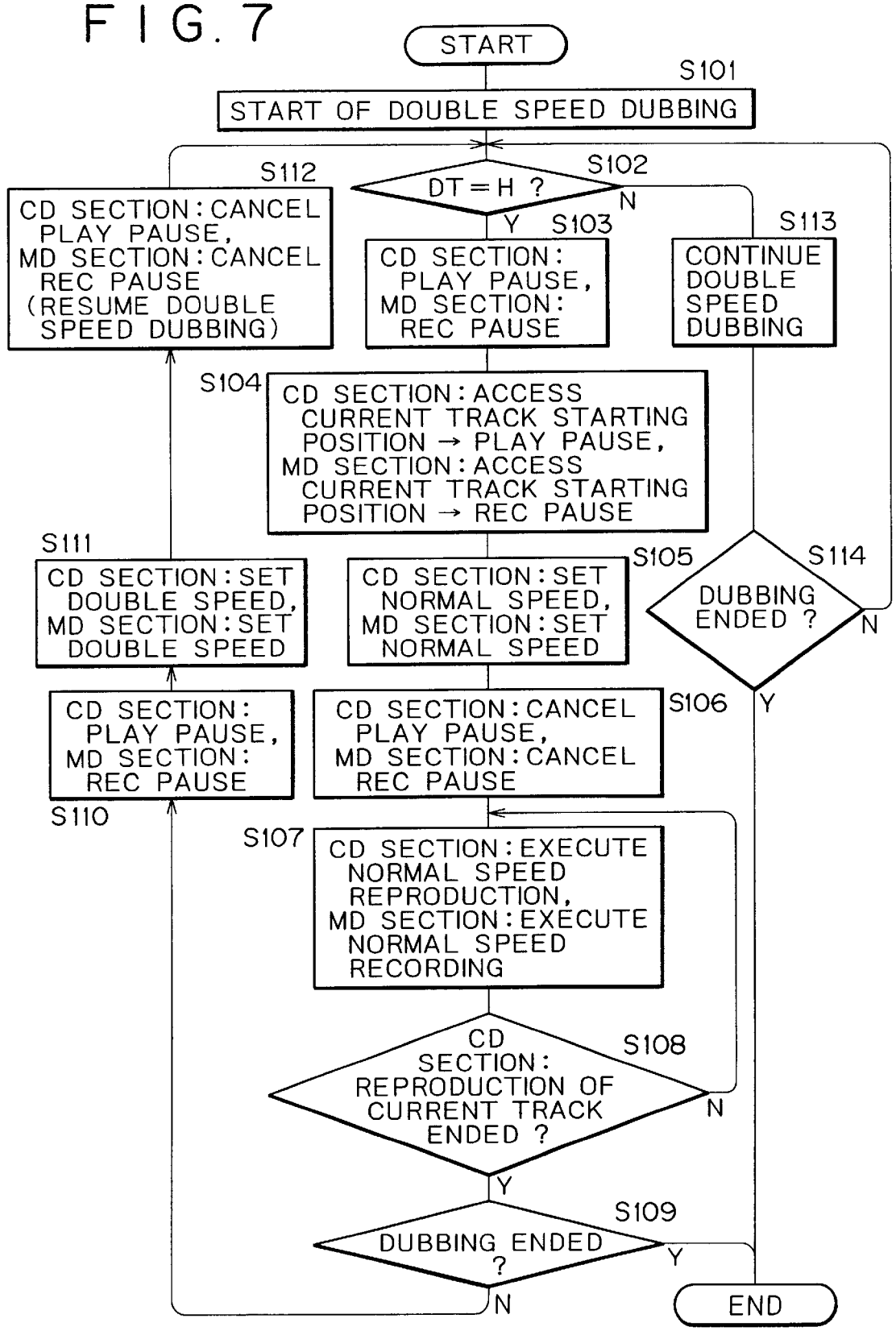

RECORDING AND REPRODUCTION APPARATUS, REPRODUCTION APPARATUS, RECORDING AND REPRODUCTION METHOD, AND REPRODUCTION METHOD

BACKGROUND OF THE INVENTION

This invention relates to a dubbing apparatus by which information in the form of an audio signal recorded, for example, on a disk-type recording medium can be reproduced and recorded onto another recording medium.

In recent years, disk media onto and from which audio data can be recorded and reproduced such as, for example, a mini disk (MD, trademark) and recording and reproduction apparatus on which such disk media can be used have been popularized widely.

Also an audio system which includes a combination of, for example, a MD recorder/player which is a recording and reproduction apparatus for a MD and a CD player or the like has been popularized widely.

In such a system as a MD recorder/player and a CD player or the like as described above, audio data are managed in a unit called "program". Here, a program in the present specification signifies a set of data which are managed and recorded in a unit on a disk, and for example, with regard to audio data, it corresponds to one tune (generally called "track") or the like. Therefore, in the following description, a program may suitably referred to as track.

Such an audio system as described above is usually constructed such that it can effect dubbing recording, that is, recording of audio data reproduced by the CD player onto a MD by the MD recorder/player.

Also a system is available which can effect high speed dubbing to reduce the recording time in such dubbing recording.

Upon high speed dubbing, a disk rotational driving control system and a reproduction signal processing system of the CD player are controlled so that a CD may be played back at a predetermined multiple speed higher than a normal reproduction speed. Also on the MD recorder/player side, a recording signal processing system is controlled so as to operate at a multiple speed corresponding to the reproduction multiple speed for a CD, and receives audio data reproduced by the CD player and records the audio data onto a MD.

For example, in an apparatus wherein a CD player as a reproduction apparatus and a MD recorder/player as a recording apparatus are integrated with each other, it is easy to control the CD player and the MD recorder/player so that they may simultaneously operate at a predetermined multiple speed so as to perform such high speed dubbing as described above. Also in another system wherein a reproduction apparatus and a recording apparatus are formed as separate units from each other, if the system is constructed such that, for example, a controlling cable or the like is used to connect the reproduction apparatus and the recording apparatus to each other so as to allow communication with each other, then high speed dubbing can be realized readily by controlling operations of the reproduction apparatus and the recording apparatus in synchronism with each other.

In a reproduction apparatus for a CD, a disk is driven to rotate in accordance with a CLV (Constant Linear Velocity) method as well known in the prior art, and an EFM signal reproduced from the CD is supplied to a PLL circuit. The PLL circuit is provided in order to produce a channel clock signal synchronized with the EFM signal. When the PLL circuit is in a locked state, the CD is driven to rotate stably at a prescribed CLV speed and a reproduction signal is processed normally.

In such an audio system as described above, when a CD is played back with a multiple speed higher than a normal speed in order to perform high speed dubbing, the PLL circuit is less likely to enter a locked state than when a CD is played back with a normal speed.

It is considered that this arises from the fact that, for example, when a disk is rotated at a high speed, the disk whirls in a shorter period with regard to a radial direction of the disk which is caused by eccentricity of the disk, and this deteriorates the follow-up performance of tracking servo control. Further, a CD is driven to rotate while it is fixedly held at a central position thereof by a chucking mechanism. However, when a CD is driven to rotate at a high speed, the holding force by the chucking mechanism does not sufficiently effectively work, resulting in slip of the CD. Consequently, the linear velocity of the CD as viewed from the optical head side varies. Also this is considered to be a cause of the phenomenon described above.

Further, a CD system involves error correction in which codes called CIRC are used. It is assumed here that high speed reproduction, for example, at a double speed is performed while a normal speed is used for a system clock signal for a signal processing system for playback of a CD. In this instance, the error correction processing of the CD system is limited from the arithmetic processing speed of the signal processing system such that, whereas double correction processing is performed for the C1 parity and quadruple correction processing is performed for the C2 parity upon normal speed reproduction as well known in the prior art, double correction processing is performed for the C1 parity and double correction processing is performed for the C2 parity upon double speed reproduction.

Consequently, the error correction ability is deteriorated more upon high speed reproduction than normal speed reproduction by a same disk defect such as a damage, a foreign article or the like to a CD. Also this deteriorates the stability of a reproduction operation.

A system which plays back, for example, a CD performs interpolation processing if a result that error correction according to the C2 parity is NG is obtained as well known in the prior art. However, since data obtained by the interpolation have values different from those of an actual audio signal waveform, depending upon a result of the interpolation or the duration of a period within which the interpolation is performed, the data may possibly sound as interpolation noise.

Accordingly, in high speed dubbing which involves high speed playback of a CD, since a reproduction operation of a CD is rendered unstable from such reasons as described above, also interpolation noise is liable to be generated. Therefore, for example, when sound recorded on a MD by high speed dubbing is reproduced, there is the possibility that such interpolation noise as described above may sound to such a degree that it cannot be ignored. In this manner, in high speed dubbing, since at least a reproduction operation of the reproduction (CD) side which performs multiple speed reproduction becomes unstable, there is the possibility that the quality (sound quality) of data recorded by dubbing cannot be secured.

A possible countermeasure against this is, for example, as a countermeasure based on a determination of a user, to perform high speed dubbing and, if significant interpolation noise is included in a result of the recording, perform recording by a normal speed dubbing operation. However, even if noise is included in recorded sound, normally it is difficult for an ordinary user to discriminate whether the noise is interpolation noise or noise originating from some other cause such as, for example, a fault of the recording side.

Another possible countermeasure is to adopt, upon high speed dubbing, a higher speed as the set speed of the system clock signal corresponding to the reproduction multiple speed in order to augment the error correction capacity described above. However, this gives rise to another problem that, since unnecessary radiation according to the system clock signal of the increased speed increases, an additional cost is required for a countermeasure against radiation noise.

SUMMARY OF THE INVENTION

It is an object of the present invention to provide a recording and reproduction apparatus, a reproduction apparatus, a recording and reproduction method and a reproduction method by which interpolation noise of reproduced information is reduced and a recording medium on which information of higher quality is recorded can be produced.

In order to attain the object described above, according to the present invention, there is provided a recording and reproduction apparatus which includes a reproduction section for reading out information recorded on a disk-type first recording medium, and a recording section for recording the information read out by the reproduction section onto a second recording medium, comprising rotational driving means for rotationally driving the first recording medium at a first rotational speed, reproduction head means for reading out the information recorded on the first recording medium rotationally driven by the rotational driving means, feeding means for feeding the reproduction head means in order to read out the information recorded at a designated position of the first recording medium, error detection means for detecting an error state of the information read out from the first recording medium by the reproduction head means, feeding control means for controlling the feeding means so that, when an error is detected by the error detection means, the reproduction head means may be fed to a reproduction position preceding to a reproduction position of the first recording medium at which the error is detected, and rotational driving control means for controlling the rotational driving means so that, after the reproduction head means is fed to the preceding reproduction position under the control of the feeding control means, the first recording medium rotationally driven by the rotational driving means may be rotated at a second rotational speed lower than the first rotational speed.

In the recording and reproduction apparatus, if it is detected that a reproduction error state of such a degree that it corresponds to occurrence of interpolation noise which occurs with a frequency higher than a predetermined frequency occurs while a disk-type first recording medium is rotationally driven at a first rotational driving speed higher than a second rotational driving speed which may be a normal speed in the reproduction section, then the reproduction head means accesses a reproduction position preceding to a reproduction position of the reproduction head means at which the error is detected, and then the first recording medium is rotated at the second rotational driving speed such as, for example, the normal speed, lower than the first rotational driving speed to start reproduction of the first recording medium beginning with the thus accessed preceding position. Thereafter, for example, when a next program (track) is to be reproduced, the first rotational driving speed is set again.

In the recording and reproduction apparatus, as steady dubbing operation, high speed dubbing operation which involves reproduction according to the first rotational driving speed is performed. But in a situation wherein it is determined based on a result of detection of an error that the reproduction operation is unstable, low speed dubbing operation which involves reproduction according to the second rotational driving speed is executed. Since the reproduction according to the second rotational driving speed stabilizes the reproduction operation, information obtained by the dubbing includes little errors. Where the recording and reproduction apparatus is applied, for example, to audio data, interpolation noise decreases as much, and consequently, a sound source recorded with good sound quality can be obtained.

Further, in the recording and reproduction apparatus, since there is no necessity, for example, to raise the rate of a system clock signal on the reproduction side to reinforce the error correction ability in order to make errors less likely to occur even if high speed dubbing (that is, high speed rotational driving on the reproduction side) is continued intentionally, the processing burden is reduced and increase in cost can be eliminated.

Preferably, the recording and reproduction apparatus is constructed such that the information recorded on the first recording medium is managed in a unit of a program, and the preceding reproduction position is a reproduction starting position of a program which is reproduced upon detection of an error by the error detection means. Thus, in the recording and reproduction apparatus, when the reproduction position preceding to the reproduction position at which the error occurs is to be accessed on the reproduction sides the recording head means returns to the starting position of the current program (track) which has been reproduced upon occurrence of the error. In other words, returning accessing is performed.

Consequently, as part of the dubbing operation, retrying of reproduction (according to the second rotational driving speed) is automatically performed from the beginning of the program with which the dubbing has failed because of occurrence of the error. As a result, the program reproduced appropriately can be recorded substantially with certainty onto the second recording medium on the recording side.

Preferably, the information is recorded in a unit of a program onto the second recording medium, and the position of the second recording medium corresponding to the preceding reproduction position is a recording starting position of a program which is recorded upon detection of an error by the error detection means. Thus, when such returning accessing as described above is performed on the reproduction side, returning accessing wherein the accessing position to the second recording medium is returned to a recording position preceding to a recording position at which the error has occurred is performed similarly on the recording side. Consequently, on the recording side, recorded data whose sound quality cannot be anticipated because of the error is erased at least by overwriting with data by later dubbing recording. Further, where the accessing position is returned to the recording position corresponding to the reproduction position preceding to the reproduction position at which the error has occurred on the reproduction side, data whose contents are continuous before and after the occurrence of the error can be recorded onto the second recording medium.

Further, since, upon the returning accessing on the recording section side, the accessing position is returned to the recording starting position of the current program (track) for which recording has been proceeding upon the occurrence of the error, data of the program whose dubbing has failed due to the occurrence of the error is erased by overwriting by recording of information of the program reproduced later according to the first rotational driving speed.

Consequently, data of a program whose dubbing has failed due to occurrence of an error during dubbing operation does not remain on the second recording medium. Therefore, for example, it is not necessary for a user to erase a track, whose dubbing has failed, later. Further, since the recording remaining time of the second recording medium on the recording side is not reduced by data of a program which otherwise remains due to failure in dubbing, the recordable time of the second recording medium can be made most of to perform dubbing.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 1 is a diagrammatic view illustrating interpolation processing in playback of a CD;

FIG. 2 is a block diagram of a recording and reproduction apparatus to which the present invention is applied;

FIG. 4 is a diagrammatic view of the U-TOC sector 0 of the mini disc system;

FIG. 5 is a diagrammatic view illustrating a form of a link provided by the U-TOC sector 0 of the mini disc system;

FIG. 6 is a diagrammatic view illustrating an example of operation of the recording and reproduction apparatus of FIG. 2 upon high speed dubbing; and FIG. 7 is a flowchart illustrating processing operation of the recording and reproduction apparatus of FIG. 2 upon high speed dubbing.

DETAILED DESCRIPTION OF THE PREFERRED EMBODIMENT

Figure 3A:
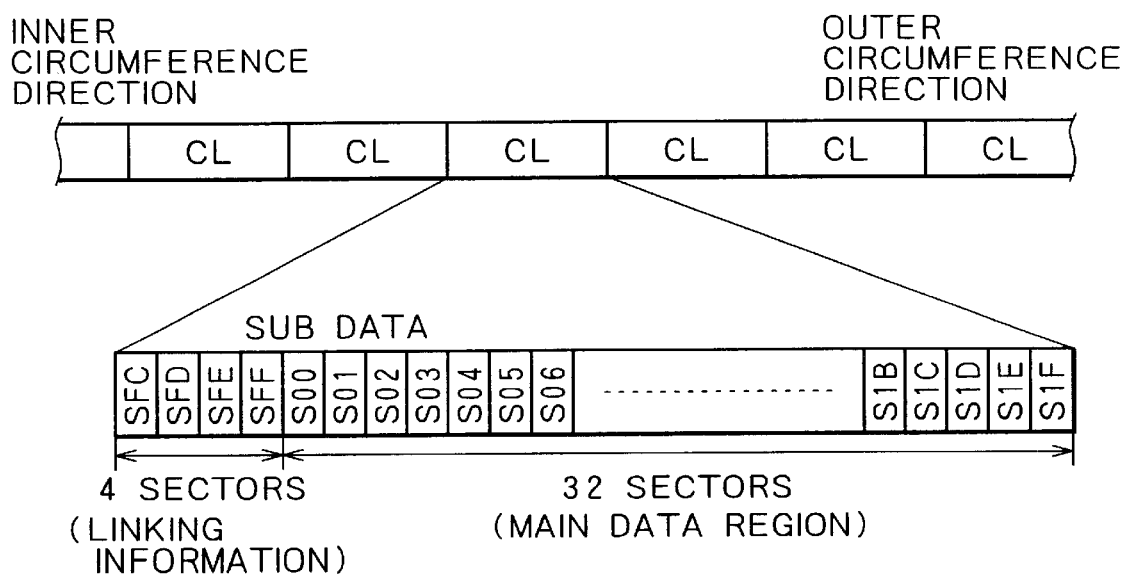
FIG. 3A is a diagrammatic view illustrating a cluster formed from a plurality of sectors in a cluster format of a mini disc system.

In the following, a preferred embodiment of the present invention is described in detail with reference to the accompanying drawings. A dubbing apparatus according to the embodiment of the present invention described below is formed as a recording and reproduction apparatus in the form of a CD/MD combination apparatus which can perform playback of a CD and recording and playback of a MD and besides can perform dubbing recording wherein audio data reproduced from a CD are recorded onto a MD.

Description is given in the following order.
1. Interpolation noise
2. Construction of the Dubbing Apparatus
3. MD Track Format
4. U-TOC
5. High Speed Dubbing Operation in the Embodiment
   5-1. Outline
   5-2. Processing Operation 1. Interpolation Noise The recording and reproduction apparatus of the present embodiment is constructed such that, upon high speed dubbing, generation of interpolation noise in sound reproduced from a CD is suppressed as far as possible so that a recording result of sound quality as high as possible can be obtained. Thus, interpolation noise is first described with reference to FIG. 1.

A signal waveform of reproduction data is illustrated in FIG. 1. On the signal waveform, sample points A to Q for error correction processing are indicated with respect to the lapse of time. The sample points A to Q correspond to error correction processing according to the C2 parity under a system which uses the CIRC.

For example, upon error correction according to the C2 parity as error correction in a CD system, a C2PO (C2 pointer) indicative of an error correction (detection) result in obtained. The C2PO is outputted with the L level if the error correction according to the C2 parity is OK, but outputted with the H level if the error correction is NG. In other words, the C2PO is a signal which is outputted when the error correction result is NG.

In FIG. 1, a mark ○ or another mark X is indicated corresponding to each of the sample points A to Q. The mark ○ corresponds to the L level (C2 correction OK) of the C2PO, and the mark X corresponds to the H level (C2 correction NG) of the C2PO.

From the signal waveform of FIG. 1, it can be seen that the C2PO exhibits the H level and error correction according to the C2 parity is NG at each of the sample points B, F. G, H and M.

In a CD system, a burst error appears at any sample point at which the C2PO of the H level is obtained, and if this signal is decoded and outputted as it is as sound, then it appears as very high noise. Therefore, in order to prevent noise when a signal is decoded and outputted, interpolation processing is performed.

As such interpolation processing, one of two interpolations including an average value interpolation and a pre-hold interpolation is selectively used.

In FIG. 1, the average value interpolation is performed at each of the sample points B, H and M. According to the average value interpolation, an average value is calculated using sample points preceding and succeeding a sample point in time and is determined as an interpolation value. In particular, for the sample points B, H and M, interpolation values are set by calculation represented, respectively, by $$B=\tfrac{1}{2}(A+C)$$

$$H=\tfrac{1}{2}(E+I)$$

$$M=\tfrac{1}{2}(L+N)$$

Meanwhile, the pre-hold interpolation is performed for the sample points F and G. In particular, interpolation values for the sample points F and G are represented by $$E=F=G$$

and consequently, as the interpolation values for the sample points F and G, a value equal to that of the sample point E is set.

Where interpolation of a signal waveform is performed in this manner, a resulting reproduction signal has a waveform proximate to an original reproduction signal waveform. However, since the reproduction signal waveform does not have fidelity to the actual waveform of the original reproduction signal, when it is outputted as sound, a sound portion corresponding to an interpolated sample point sounds as noise to a user. This is interpolation noise. The interpolation noise becomes more conspicuous, for example, as the number of samples with which the C2PO exhibits the H level increases per unit time.

2. Construction of the Dubbing Apparatus

Now, a construction of a MD/CD combination apparatus which is a dubbing apparatus to which the present invention is applied is described.

Referring to FIG. 2, a magneto-optical disc (MD) 90 is loaded into a MD section which performs a recording and reproduction operation onto and from a MD.

The MD 90 is used as a medium onto which audio data can be recorded, and is driven to rotate by a spindle motor 2 upon recording/reproduction.

Upon recording/reproduction, an optical head 3 irradiates a laser beam upon the MD 90 as a magneto-optical disc so that it operates as a head upon recording/reproduction. In particular, upon recording, the optical head 3 outputs a laser beam of a high level for heating a recording track to a Curie temperature. However, upon reproduction, the optical head 3 outputs a laser beam of a comparatively low level for detecting data from reflected light from the MD 90 by a magnetic Kerr effect.

To this end, the optical head 3 includes an optical system which in turn includes a laser diode, a polarizing beam splitter, an objective lens 3a and so forth, and a detector for detecting reflected light. The objective lens 3a is supported for displacement in a radial direction of and in a direction toward or away from the MD 90 by a biaxial mechanism 4. Further, the entire optical head 3 is mounted for movement in a radial direction of the MD 90 by a sled mechanism 5.

A magnetic head 6a is disposed in an opposing relationship to the optical head 3 across the MD 90. The magnetic head 6a operates to apply to the MD 90 a magnetic field modulated with data supplied thereto.

The optical head 3 and the magnetic head 6a are supported for movement in a radial direction of the MD 90 by the sled mechanism 5.

Information detected from the MD 90 by the optical head 3 upon reproduction operation is supplied to a RF (radio frequency) amplifier 7. The RF amplifier 7 performs arithmetic processing for the information supplied thereto to extract a reproduction RF signal, a tracking error signal, a focusing error signal, groove information and other necessary information from the information. The groove information is absolute position information recorded as wobbling shapes of grooves which are recorded tracks of the MD 90. The extracted reproduction RF signal is supplied to an encoder/decoder section 8.

Meanwhile, the tracking error signal and the focusing error signal are supplied to a servo circuit 9, and the groove information is supplied to and demodulated by an address decoder 10. Address information decoded from the groove information and address information, sub code information and so forth recorded as data and decoded by the encoder/decoder section 8 are supplied to a MD controller 11 formed from a microcomputer so that they are used for various controls.

It is to be noted that the MD controller 11 functions as a member which executes various operation controls of the MD section.

The servo circuit 9 generates various servo driving signals based on the tracking error signal and the focusing error signal supplied thereto from the RF amplifier 7, a track jump instruction, an access instruction, rotational speed detection information of the spindle motor 2, and so forth from the MD controller 11 to control the biaxial mechanism 4 and the sled mechanism 5 to effect focusing and tracking control and control the spindle motor 2 to rotate at a constant linear velocity (CLV).

The reproduction RF signal is subject to decoding processing such as EFM demodulation and CIRC (Cross Interleave Reed-Solomon Coding) in the encoder/decoder section 8. A resulting signal from the encoder/decoder section 8 is written once into a buffer memory 13 by a memory controller 12. It is to be noted that reading of data from the MD 90 by the optical head 3 and transfer of reproduction data in a system from the optical head 3 to the buffer memory 13 are performed at the rate of 1.41 Mbit/sec and besides intermittently.

The data written in the buffer memory 13 are read out at a timing at which transfer of the reproduction data is performed at the rate of 0.3 Mbit/sec, and are supplied to an audio encoder/decoder section 14. The data supplied to the audio encoder/decoder section 14 are subject to reproduction signal processing such as decoding processing corresponding to audio compression processing so that they are converted into digital audio data sampled with 44.1 KHz and quantized with 16 bits. The digital audio data are converted into an analog signal by a D/A converter 15 and then supplied to a terminal $T_{MD}$ of a switch circuit 50.

Upon reproduction operation for the MD 90, the switch circuit 50 is controlled by a system controller 21, which controls operation of the entire apparatus, so that it may be connected to the terminal $T_{MD}$. Accordingly, a reproduction audio signal outputted from the audio encoder/decoder section 14 and converted into an analog signal by the D/A converter 15 is supplied through the switch circuit 50 to a sound volume adjustment section 51 and a power amplifier 52 and is outputted as reproduction sound from a speaker 53.

It is to be noted that, while writing/reading out of data into/from the buffer memory 13 are performed with an address designated by control of a write pointer and a read pointer by the memory controller 12, since the bit rates upon writing into and reading out from the buffer memory 13 are made different from each other as described above, some amount of data is normally stored in the buffer memory 13.

Since a reproduction audio signal is outputted through the buffer memory 13 in this manner, even if tracking of the optical head 3 is brought out of order, for example, by a disturbance, the reproduction audio output is not interrupted, and for example, if the optical head 3 accesses a correct tracking position to restart reading out data while some stored data remains in the buffer memory 13, then the operation can be continued without having an influence on the reproduction output. In other words, the vibration withstanding function can be augmented significantly.

The present recording and reproduction apparatus further includes a digital interface 54, and reproduction data decoded by the encoder/decoder section 14 upon reproduction is supplied also to the digital interface 54. The digital interface 54 encodes the received reproduction data into a data stream of a predetermined digital interface format using the reproduction data and sub code information and so forth extracted simultaneously upon reproduction. The data stream can be outputted from a digital output terminal 56. The digital interface 54 outputs the encoded data, for example, as an optical digital signal. In other words, the digital interface 54 can output the reproduction data to an external apparatus while the data remain digital data.

When a recording operation is performed for the MD 90, a recording signal (analog audio signal) supplied to an analog input terminal 17 is converted into digital data sampled with 44.1 KHz and quantized with 16 bits by an A/D converter 18. The digital data is supplied to the encoder/decoder section 14, by which audio compression encoding processing for compressing data to approximately ⅕ in amount is performed for the digital data.

Also it is possible to record data fetched through the digital interface 54 onto the MD 90. In particular, a signal of a digital interface format supplied to a digital input terminal 55 from an external apparatus is decoded by the digital interface 54 so that audio data, sub codes and so forth are extracted from the signal. The control information such as the sub codes is supplied to a system controller 21, and the audio data as the recording data, that is, the digital data sampled with 44.1 KHz and quantized with 16 bits, are supplied to the encoder/decoder section 14, by which audio compression encoding processing for compressing data to approximately ⅕ in amount is performed for the digital data.

Furthermore, it is also possible to record audio data reproduced from a CD 91 by a CD section which is hereinafter described onto the MD 90. This is so-called dubbing recording. In this instance, CD reproduction data cdg which are audio data reproduced from the CD 91 and outputted from an EFM/CIRC decoder 37, that is, digital data sampled with the sampling frequency of 44.1 KHz and quantized with 16 bits, are supplied to the encoder/decoder section 14, by which audio compression encoding processing for compressing data to approximately ⅕ in amount is performed for the digital audio data.

A digital input PLL circuit 58 receives the digital audio data inputted through the digital interface 54 or the CD reproduction data cdg outputted from the CD section which is hereinafter described and produces a clock signal CLK·M synchronized with a synchronizing signal or synchronization pattern inserted in the audio data inputted. The clock signal CLK·M has a predetermined frequency equal to a multiple of, for example, fs=44.1 KHz.

The clock signal CLK·M is divided or multiplied into a signal of a required frequency and utilized at least as a clock signal for signal processing in the encoder/decoder section 14 and for transferring data for inputting to and outputting from the encoder/decoder section 14 upon recording of data inputted in the form of digital data to the MD section onto the MD 90.

The recording data compressed by the encoder/decoder section 14 is written once into the buffer memory 13 by the memory controller 12 and then read out at a predetermined timing and sent to the encoder/decoder section 8. Then, the compressed recording data is subject to encoding processing such as CIRC encoding and EFM demodulation by the encoder/decoder section 8 and then supplied to a magnetic head driving circuit 6.

The magnetic head driving circuit 6 supplies a magnetic head driving signal to the magnetic head 6a in response to the thus encoded recording data. In short, the magnetic head driving circuit 6 controls the magnetic head 6a to execute application of a magnetic field of the N or S pole to the MD 90. In this instance, the MD controller 11 supplies a control signal to the optical head 3 so that it may output a laser beam of the recording level.

In order to perform a recording/reproduction operation onto/from the MD 90 under the control of the MD controller 11, management information recorded on the MD 90, that is, the P-TOC (pre-mastered TOC) and the U-TOC (user TOC), need be read out. The MD controller 11 discriminates an address of an area to be recorded on the MD 90 or an address of an area to be played back based on the management information. The management information is stored into the buffer memory 13. In order to hold the management information, the buffer memory 13 has divisionally set thereon a buffer area for such recording data/reproduction data as described above and an area for storing such management information as mentioned above.

The MD controller 11 reads out the management information by causing a playing back operation of the innermost circumferential side of the MD 90, on which the management information is recorded, to be executed when the MD 90 is loaded into the MD section. The management information is stored into the buffer memory 13 so that it can be referred to later upon a recording/reproduction operation onto/from the MD 90.

While the U-TOC is edited and rewritten in response to recording or erasure of data, each time a recording/erasure operation is performed, the MD controller 11 performs such editing processing as mentioned above for the U-TOC information stored in the buffer memory 13 and rewrites the U-TOC area of the MD 90 at a predetermined timing in accordance with the rewriting operation into the buffer memory 13.

The recording and reproduction apparatus further includes a CD section which is a reproduction system for a CD.

A CD 91 which is an optical disk for reproduction only is loaded into the CD section which performs a CD playback operation.

The CD 91 is driven to rotate at a constant linear velocity (CLV) by a spindle motor 31 upon reproduction operation. Data recorded in the form of pits on the CD 91 is read out by an optical head 32 and supplied to a RF amplifier 35. In the optical head 32, an objective lens 32a is supported by a biaxial mechanism 33 for displacement in tracking and focusing directions.

Further, the optical head 32 is supported for movement in a radial direction of the CD 91 by a sled mechanism 34.

The RF amplifier 35 produces a reproduction RF signal as well as a focusing error signal and a tracking error signal. The error signals are supplied to a servo circuit 36.

The servo circuit 36 produces various driving signals including a focusing driving signal, a tracking driving signal, a sled driving signal and a spindle driving signal from the focusing error signal and the tracking error signal and controls operation of the biaxial mechanism 33, sled mechanism 34 and spindle motor 31.

The reproduction RF signal is supplied to the decoder 37. The decoder 37 first performs binary digitization of the reproduction RF signal inputted thereto to obtain an EFM signal. Then, the decoder 37 performs EFM demodulation, CIRC decoding and so forth for the EFM signal so that it decodes the information read from the CD 91 into digital audio data sampled with 44.1 KHz and quantized with 16 bits.

Here, the CIRC decoding signifies error detection and error correction processing which makes use of the CIRC, and as well known in the prior art, in the CIRC decoding, error detection and error correction processing with C1 and C2 codes is executed. As described hereinabove with reference to FIG. 1, when the error correction result with a C2 code is NG, the C2PO of the H level is obtained.

In the recording and reproduction apparatus of the present embodiment, upon high speed dubbing, required control processing is executed based on the C2PO. To this end, the recording and reproduction apparatus of the present embodiment includes a pulse width discrimination circuit 40.

For example, if a sample point at which the error correction processing with a C2 code results in NG appears successively, then also the pulse width of the C2PO of the H level becomes long in accordance with the number of such successively appearing sample points. Thus, the pulse width discrimination circuit 40 receives the C2PO obtained from the decoder 37 and detects whether or not the pulse width of the C2PO is equal to or greater than a predetermined width set in advance.

The pulse width discrimination circuit 40 outputs a pulse width detection signal DT of the H level when the pulse width of the C2PO pulse is equal to or greater than the predetermined width, but outputs the pulse width detection signal DT of the L level if the pulse width is smaller than the predetermined width.

The pulse width of the C2PO to be detected is set, for example, based on a pulse width or successive sample point number within which the C2PO has the H level corresponding to a state wherein interpolation noise described with reference to FIG. 1 is prominent to such a degree that it cannot be ignored.

Accordingly, the state wherein the pulse width detection signal DT has the H level indicates that the reproduction operation is unstable (the frequency in which the C2PO has the H level is high) to such a degree that interpolation noise cannot be ignored with respect to sound.

The decoder 37 is constructed so that it can extract also control data such as the TOC and sub code data. The TOC and the sub code data extracted by the decoder 37 are supplied to the system controller 21 and used for various controls.

The EFM signal obtained by the binary digitization of the decoder 37 is supplied also to a PLL circuit 39.

The PLL circuit 39 outputs a clock signal PLCK synchronized with channel bits of the EFM signal inputted thereto. The clock signal PLCK has a frequency of 4.3218 MHz in a normal speed operation. The clock signal PLCK is utilized as a clock signal, for example, by a signal processing system beginning with the decoder 37.

The digital audio data outputted from the decoder 37 is converted into an analog audio signal by a D/A converter 38 and supplied to a terminal TCD of the switch circuit 50. Upon playback operation of a CD, the system controller 21 controls the switch circuit 50 to select the terminal TCD so that a reproduction audio signal reproduced from the CD 91 and converted into an analog signal by the D/A converter 38 is supplied to the sound volume adjustment section 51 and the power amplifier 52 through the switch circuit 50 and outputted as a reproduction audio signal from the speaker 53.

Further, in the reproduction and recording apparatus of the present embodiment, reproduction data of a CD can be dubbing recorded onto a MD 90. In this instance, digital audio data outputted from the decoder 37 is supplied as it is to the encoder/decoder section 14.

Also digital audio data outputted from the decoder 37 is supplied to the digital interface 54 so that it can be outputted as CD reproduction data cdg in the form of digital data from the digital output terminal 56 to an external apparatus.

In order to play back the CD 91, the system controller 21 need read out management information recorded on the CD 91, that is, the TOC. The system controller 21 discriminates the number and addresses of tracks recorded on the CD 91 based on the management information and performs reproduction operation control. To this end, the system controller 21 causes a reproduction operation on the innermost circumference side of the CD 91 on which the TOC is recorded to be executed to read out the TOC when the CD 91 is loaded, and stores the TOC, for example, into an internal RAM of the system controller 21 so that it may thereafter refer to the TOC upon reproduction operation for the CD 91.

The system controller 21 is a microcomputer which controls the entire apparatus, and provides various instructions to the MD controller 11 so that operation control of the MD section may be executed by the MD controller 11. Upon recording or reproduction of the MD 90, the system controller 21 receives management information such as sub codes from the MD controller 11.

Meanwhile, in the CD section, for example, the system controller 21 directly performs operation control.

It is to be noted that such a form of the control system as described above is a mere example, and for example, a CD controller which performs control of the CD side may be provided additionally. Or, the system controller 21 and the MD controller 11 may alternatively be formed as a single controller.

An operation section 19 includes a recording key, a reproduction key, a stop key, an AMS key, a search key, a dubbing key for setting of normal speed dubbing/high speed dubbing and other necessary keys such that they can be operated by a user so that reproduction/recording operations regarding the MD 90 and the CD 91 may be performed.

Further, the operation section 19 allows inputting of a character string for recording incidental data such as a track name onto the MD 90, a registration determination operation and a registration mode operation.

Operation information from the operation section 19 is supplied to the system controller 21, and the system controller 21 controls the other components to execute required operations based on the operation information and an operation program.

It is to be noted that, though not shown in FIG. 2, the operation section 19 may additionally have, for example, a remote control operation function by an infrared remote commander.

A display section 20 performs a required displaying operation upon reproduction or recording of the MD 90 or CD 91. In particular, the display section 20 displays time information such as, for example, a total play time or an elapsed time upon reproduction or recording and other required information such as a track number, an operation state or an operation mode under the control of the system controller 21.

In the recording and reproduction apparatus of the present embodiment constructed in such a manner as described above, a MD playback operation, a MD recording operation, a CD playback operation and a dubbing operation from a CD onto an MD can be performed.

Particularly in the reproduction and recording apparatus of the present embodiment, it is also possible to execute a normal speed dubbing operation as a dubbing operation from a CD onto a MD. However, also it is possible to execute a high speed dubbing operation at a higher predetermined multiple speed. It is to be noted, however, that, while the multiple speed upon high speed dubbing may be set arbitrarily in the recording and reproduction apparatus of the present embodiment, it is presupposed in the following description that the apparatus can execute high speed dubbing according to a double speed (double speed dubbing).

Where the reproduction and recording apparatus has such a construction as described hereinabove with reference to FIG. 2, operation of double speed dubbing can be performed, for example, in the following manner.

First, the servo circuit 36 of the CD section sets the speed to the double speed CLV and drives the spindle motor 31. In the state wherein the speed of the spindle motor 31 is set to the double speed CLV, the recording and reproduction apparatus performs reproduction of data from the CD 91. Further, the PLL circuit 39 sets the target value for locking, for example, corresponding to the double speed to 2×4.3218=8.6436 MHz (clock frequency equal to twice that upon normal speed reproduction). It is to be noted that such changeover of the target value for the PLL circuit 39 is controlled by the system controller 21.

When the PLL circuit 39 is in a locked state with the double speed described above, the CD 91 is rotated stably at the double speed CLV, and normal signal processing is executed at the double transfer rate by the decoder 37 (and D/A converter 38).

Then, since data is processed at the double speed in this manner by the decoder 37, CD reproduction data cdg (sampled with a sampling frequency of 88.2 KHz (=44.1×2) and quantized with 16 bits) having a transfer rate equal to twice that in a normal speed operation is transmitted to the encoder/decoder section 14 of the MD section side.

The CD reproduction data cdg according to the double transfer rate is inputted also to the digital input PLL circuit 58. The digital input PLL circuit 58 sets the target value so that the CD reproduction data cdg may be locked with a channel clock frequency equal to twice the normal speed. The changeover of the target value is performed under the control of the MD controller 11, for example, in accordance with a command (COMMAND) from the system controller 21.

In a state wherein the digital input PLL circuit 58 locks the CD reproduction data cdg with the frequency equal to twice that at the normal speed, a frequency equal to twice that upon normal rate operation is obtained as the clock signal CLK·M. Then, for example, the encoder/decoder section 14 performs signal compression processing and transfer to the memory controller 12 (data writing into the buffer memory 13) at a timing of the clock signal CLK.

M thereby to execute recording signal processing synchronized with the CD reproduction data cdg of the double transfer rate supplied from the CD section.

Further, operation timings until data stored in the buffer memory 13 are recorded onto the MD 90 through reading into the encoder/decoder section 8 and signal processing by the encoder/decoder section 8 are obtained suitably utilizing, for example, the master clock supplied from the MD controller 11 side or a clock signal and so forth obtained upon rotational control utilizing a period of wobbles formed on the MD.

As can be recognized from the foregoing description, upon recording, since the reading out speed is set higher than the writing speed of data into the buffer memory 13, recording in the MD section is performed intermittently onto the MD 90. In particular, if an amount of data greater than a certain predetermined amount is stored in the buffer memory 13, then the MD section performs writing of data onto the MD 90. Then, if the stored data amount of the buffer memory 13 becomes smaller than the predetermined amount or becomes "0" as a result of the data writing operation, then the MD section waits until the predetermined amount of data with which writing onto the MD 90 is possible is stored. In the recording operation by the MD section, such operations as just described are repetitively executed.

The rotational driving speed of the MD 90 and the transfer rate and the signal processing rate of input/output data to/from the encoder/decoder section 8 upon double speed dubbing need not necessarily be set to the double speed in a corresponding relationship to reproduction being performed at the double speed by the CD section side.

In particular, even if the MD 90 is driven to rotate at the normal speed and the input/output rates of data to/from the encoder/decoder section 8 and the signal processing speed by the encoder/decoder section 8 are set to the normal rates and speed, data recording onto the MD 90 is executed appropriately by such operation to make the writing rest period onto the MD 90 shorter than that upon normal speed operation or to perform continuous recording operation without performing intermitting recording.

However, depending upon conditions of, for example, the capacity of the buffer memory 13, the rotational driving speed of the MD 90 and the transfer rate of input/output data to/from and the signal processing speed in the encoder/decoder section 8 may be set to the double speeds.

3. MD Track Format

A cluster format of recording data tracks of the magneto-optical disc (MD) 90 is described here.

Figure 3B:
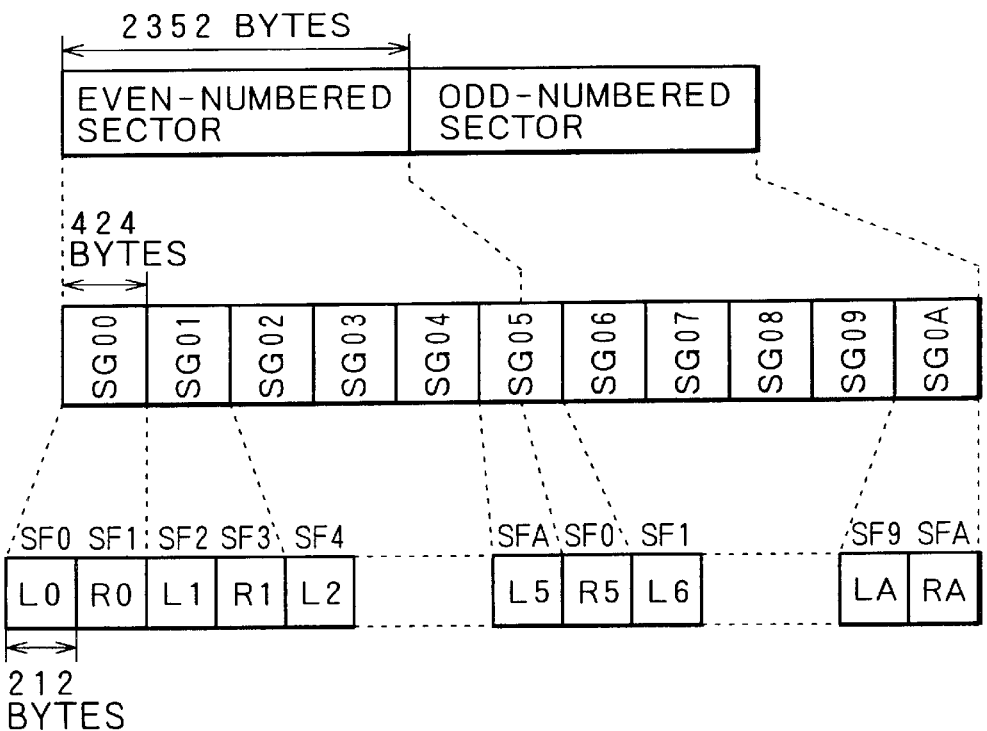
FIG. 3B is a diagrammatic view illustrating an arrangement of sectors in the cluster format of the mini disc system.

Recording operation of a mini disc system is performed in a unit called cluster, and the format of the cluster is shown in FIGS. 3A and 3B.

In a recording track in the mini disc system, clusters CL are formed successively as seen in FIG. 3A, and one cluster makes a minimum unit upon recording. One cluster corresponds to 2 to 3 circumferential tracks.

Referring to FIG. 3A, one cluster CL includes a sub data region of four sectors SFC to SFF and a main data region of 32 sectors S00 to S1F. The main data are, where they are data for an audio signal, audio data compressed by such ATRAC processing as described above.

As seen from FIG. 3B, one sector is a unit of data including 2,352 bytes.

The sub data region of four sectors shown in FIG. 3A is used as a sub data area or a linking area, and TOC data, audio data and so forth are recorded in the main data region of 32 sectors. The sectors of the linking area are dummy sectors provided in order that, since the interleave length of the CIRC adopted in the recording and reproduction apparatus of the present embodiment is longer than the length of one sector (13.3 msec) adopted by a CD and so forth when error correction processing in performed, the difference between the interleave length and the one sector length may be absorbed, and are basically regarded as a reserved area. However, the sectors of the reserved area may be used otherwise to record data for some processing or some control data.

It is to be noted that an address is recorded for each one sector.

One sector is further divided into units called sound groups. More particularly, two sectors are divided into 11 sound groups.

More specifically, as seen from FIG. 3B, two successive sectors including an even-numbered sector such as the sector S00 and an odd-numbered sector such as the sector S01 include sound groups SG00 to SG0A. One sound group is formed from 424 bytes and includes an amount of audio data corresponding to the time of 11.61 msec.

Data are recorded separately for the L channel and the R channel in one sound group SG. For example, the sound group SG00 includes L channel data L0 and R channel data R0, and the sound group SG01 includes L channel data L1 and R channel data R1.

It is to be noted that 212 bytes which make a data region for the L channel or the R channel is called sound frame.

4. U-TOC

Such cluster formats as described hereinabove with reference to FIGS. 3A and 3B are formed over an overall area of the magneto-optical disc (MD) 90. The magneto-optical disc (MD) 90 is divided radially into circumferential areas, and the radially innermost circumferential area is used as a management area while a program area is formed next to the management area.

It is to be noted that the innermost circumferential area of the disk includes a reproduction only area in which reproduction only data are recorded in the form of phase pits, and a magneto-optical area is formed next to the reproduction only memory and allows magneto-optical recording and reproduction. The management area thus includes the reproduction only area and an innermost circumferential portion of the magneto-optical area.

The program area is formed next to the management area of the magneto-optical area. In the program area, audio data is recorded on each sector as a main data area described hereinabove with reference to FIG. 3A.

On the other hand, in the reproduction only area of the management area, a P-TOC (pre-mastered TOC) for management of the areas of the entire disk is provided. In the next management area in the magneto-optical area, table information (U-TOC; user table of contents) for management of programs (tunes and so forth) recorded in the program area is recorded.

Here, U-TOC sectors for management information to be used for management of recording/reproduction operation of the tracks (tunes and so forth) of the MD 90 are described.

FIG. 4 shows a format of the U-TOC sector 0.

It is to be noted that, as the U-TOC sectors of the MD 90, the sectors from the Sector 0 up to the sector 31 can be provided. In other words, the sectors (S00 to S1F) of one cluster in the management area are used. The sector 1 and the sector 4 can be used as an area in which character information is to be recorded and the sector 2 is used as an area into which recording dates/hours are to be recorded.

The U-TOC sector 0 is a data area in which management information principally regarding tunes and so forth recorded by a user and free areas into which tunes can be recorded newly is recorded. In other words, in the sector 0, the start point (start address) and the end point (end address) of each of the programs recorded in the program area, and copy protect information, emphasis information and so forth of each program are managed.

For example, if a user intends to record a certain tune onto the disc 90, then the system controller 21 searches out a free area on the disc 90 from the U-TOC sector 0 and controls to record audio data into the free area. On the other hand, upon reproduction from the MD 90, the system controller 21 discriminates an area in which a tune to be reproduced is recorded from the U-TOC sector 0, and accesses the area in which the tune to be reproduced is recorded to perform a reproduction operation.

As seen from FIG. 4, the U-TOC sector 0 has a header part in which a sync pattern is formed from 12 bytes. Next to the header part, data of 3 bytes ("Cluster H", "Cluster L" and "SECTOR") representative of an address of the sector, a maker code ("maker code") and a model code ("model code") indicative of a manufacturer of the disk, a first program number ("First TNO"), a last program number ("Last TNO"), a sector use situation ("used sectors"), a disk serial number ("disc serial No"), and a disk ID are recorded in the U-TOC sector 0.

Further, a correspondence table indication data section is recorded. The correspondence table indication data section includes a pointer P-DFA (Pointer for defective area) indicating the top position of slots into which detection position information produced on the disk is stored, another pointer P-FMPTY (Pointer for Empty slot) indicating a situation of use of slots, another pointer P-FRA (Pointer for Freely area) indicating the top position of slots for management of a recordable area, pointers P-TNO1, P-TNO2, ... P-TNO255 individually indicating the top positions of slots corresponding to the individual programs.

The correspondence table indication data section is followed by a management table section in which 255 slots of 8 bytes are provided. Each of the slots is used for management of a start address, an end address, a track mode and link information.

The magneto-optical disk 90 described above need not necessary have data recorded continuously thereon and may have a sequential data string recorded discretely (in a plurality of parts) thereon. It is to be noted that the term "part" signifies a portion in which successive data in time are recorded physically continuous clusters.

Thus, in the recording and reproduction apparatus (MD section of FIG. 2) on which the disk 90 is used, since data are stored once into the buffer memory 13 and the write rate and the readout rate into and from the buffer memory 13 are made different from each other, by causing the optical head 3 to successively access data discretely recorded on the disk 90 so that data are accumulated into the buffer memory 13, the data can be reproduced in a sequential data string on the buffer memory 13.

Even if the recording and reproduction apparatus of the present embodiment is constructed in such a manner as described above, since the write rate into the buffer memory upon reproduction is set higher than the readout rate, the recording and reproduction apparatus of the present invention can perform continuous audio reproduction without being interrupted.

With the recording and reproduction apparatus of the present embodiment, even if a second program shorter than a first program recorded already on a disk is overwritten on the first program, the recording capacity of the disk can be used efficiently by designating the remaining area on which the first program remains written without being erased as a recordable area (an area managed from the pointer P-FRA).

A method of linking different areas present discretely on a disk using an example of the pointer P-FRA for management of recordable areas is described with reference to FIG. 5.

If it is assumed that, for example, a value 03h (hexadecimal) is recorded in the pointer P-FRA which indicates the top position of slots for management of the recordable areas, then the slot corresponding to this value "03h" is accessed subsequently. In other words, data of the slot 03h of the management table section is read in.

Data of the start address and the end address recorded in the slot 03h indicate the start point and the end point of one part recorded on the disk, respectively.

The link information recorded in the slot 03h indicates the address of a slot to be accessed next to the slot 03h. In FIG. 4, 18h is recorded as the link information.

Consequently, the slot 18h is accessed subsequently, and another part is grasped from the start address and the end address recorded in the slot 18h. Then, the slot 1Fh is accessed based on the link information of the slot 18h.

In this manner, the link information is successively traced similarly until the data "00h" as the link information appears while the addresses of all parts managed from the pointer P-FRA can be grasped.

By tracing slots until the link information of null (=00h) appears from the start point defined by a slot indicated by the pointer P-FRA as described above, parts recorded discretely on the disk can be linked on the memory. In this instance, all parts of the recordable areas on the disk 90 can be grasped.

While the manner of linking slots are described taking the pointer P-FRA as an example, also the pointers P-DFA, P-EMPTY, P-TNO1, P-TNO2, . . . , P-TNO255 are used similarly for management by linking different parts which are present discretely on the disk.

5. High Speed Dubbing Operation in the Embodiment

5-1. Outline

Subsequently, high speed dubbing (double speed dubbing) operation of the recording and reproduction apparatus of the present embodiment is described. First, an outline of the operation is described with reference to FIG. 6.

FIG. 6 illustrates high speed dubbing operation when four tracks from the first track to the fourth track are reproduced from the CD 91 by the CD section and recording of four tracks from the first track to the fourth track is performed also by the MD section in a corresponding relationship to the reproduction from the CD 91. In the following, the high speed dubbing operation is described in accordance with procedures of ① to ⑨ illustrated in FIG. 6.

Procedure ①: On the CD section side, reproduction of the first track is started at a double speed. In this instance, the CD 91 is driven to rotate according to the double speed CLV. Together with the double speed reproduction of the CD 91, the MD section side executes signal processing synchronized with the double speed reproduction to start operation to perform recording for the first track.

Procedure ②: The double speed reproduction is continuously executed on the CD section as far as a pulse width detection signal DT obtained based on the C2PO described hereinabove does not become the H level but remains the L level. In response to the double speed reproduction of the CD 91, the recording operation suitable for the double speed is continued on the MD section side. In short, double speed reproduction is performed also on the MD section side.

In FIG. 6, double speed dubbing is performed appropriately for the first and second tracks, and double speed dubbing is started also for the third track.

Procedure ③: While the double speed dubbing is proceeding for the third track, it is detected by the system controller 21 that the pulse width detection signal DT has changed to the H level.

Procedure ④: When it is detected by the system controller 21 that the pulse width detection signal DT has changed to the H level, the system controller 21 on the CD section side controls so that the reproduction operation may be temporarily stopped (PLAY pause), and thereafter, it controls so that the optical head 32 accesses the reproduction starting position of the third track which is a current truck for which reproduction has been performed till then.

Also on the MD section side, the system controller 21 controls through the MD controller 11 so that the recording operation may be temporarily stopped (REC pause). Thereafter, the system controller 21 controls so that the optical head 3 and the magnetic head 6a may access the recording starting position of the third track which is the current truck for which recording has been performed till then.

Procedure ⑤: After the accessing to the reproduction and recording starting positions of the third track of the CD 91 and the third track of the MD 90 by the optical head 3 and the magnetic head 6a according to the procedure ④ described above is completed, the system controller 21 on the CD section side sets the PLAY pause again and then sets the normal speed. In other words, the rotational driving speed for the CD 91 is set to the normal speed CLV which is lower than the double speed CLV.

Corresponding to this, also the MD controller 11 on the MD section side sets the REC pause again and then changes the setting so that recording operation corresponding to the normal speed may be obtained.

Procedure ⑥: After the setting of the normal speed by the system controller 21 and the MD controller 11 of the procedure ⑤ is ended, reproduction according to the normal speed is executed from the starting position of the third track on the CD section side, and also on the MD section side, recording according to the normal speed is performed from the recording starting position of the third track to an intermediate position of which the recording has been performed beforehand. In other words, normal speed dubbing at the normal speed is performed.

The normal speed dubbing according to the procedure ⑥ is performed only for the third track. In other words, the normal speed dubbing according to the procedure ⑥ is performed only for a track with regard to which DT=H has been detected in the procedure ③ described hereinabove.

In other words, if DT=H is detected for the third track by the system controller 21 as in the present case, the recording and reproduction apparatus of the present embodiment determines that high speed reproduction according to the double speed is difficult for a recording area of the third track of the CD 91 by some cause and interpolation noise tends to occur. Then, for the track with which interpolation noise is liable to be generated with a high degree of possibility, dubbing according to the normal speed is performed to obtain stabilized reproduction operation to suppress the frequency of generation of interpolation noise.

Procedure ⑦: Here, if it is assumed that the normal speed dubbing for the third track is completed by the procedure ⑥ described above, then the system controller 21 on the CD section side controls so that the PLAY pause and the double speed may be set at the starting position (start address) of the next fourth track.

Also the MD controller 11 on the MD section side controls so that REC pause condition and the double speed may be set, for example, at an immediate position next to the recording end position (end address) of the third track.

Procedure ⑧: After the double speed is set on the CD section and the MD section by the procedure ⑦ described above, on the CD section side, the PLAY pause state is cancelled and double speed reproduction is executed from the starting position (start address) of the fourth track under the control of the system controller 21. Also on the MD section side, the REC pause condition is cancelled and recording of the fourth track is started according to the double speed using the address immediately following the recording end position (end address) of the third track as a start address under the control of the MD controller 11. In short, double speed dubbing is started with the fourth track.

Procedure ⑨: In FIG. 6, the double speed dubbing can be continued for the fourth track. Further, in this instance, the reproduction of the CD 91 is ended with the fourth track. In response to this, also the MD section side ends the recording onto the MD 90. In other words, the dubbing operation is ended.

In such procedures as described above, dubbing operation is tried again by normal speed dubbing for a track with which it is discriminated that an error has occurred during double speed dubbing. This is intended to suppress, where an error is liable to occur and there is the possibility that interpolation noise may become conspicuous, generation of interpolation noise by obtaining a stable reproduction condition according to the normal speed to perform dubbing. Consequently, as a result of recording onto a MD onto which dubbing recording is to be performed, good sound quality having no conspicuous interpolation noise is obtained.

In the procedures illustrated in FIG. 6, if an error occurs (DT=H is detected) and retrying of dubbing is executed, then dubbing of a track with which the error has occurred is performed again from the beginning.

For example, otherwise if, at a point of time when an error occurs during dubbing of a certain track, retrying of dubbing is performed from the recording position then, then a result of the recording till the point of time at which the error occurs when the track is recorded first is managed excessively as an already recorded track. Although this can be erased by an erasing operation of a user afterwards, this operation is cumbersome. Further, in such a situation that the total reproduction time of the CD side is almost equal to the recording allowing time of the MD, there sufficiently is the possibility that reproduction data of the CD cannot be dubbing recorded fully onto the MD.

In contrast, with the recording and reproduction apparatus of the present embodiment, since, for an MD for which dubbing recording is performed, erasure of a track with which an error has occurred is performed so as to allow new overwriting onto the track and re-recording is performed for the track, such a disadvantage as described just above is eliminated.

It is to be noted that, with the procedures described hereinabove with reference to FIG. 6, high speed dubbing is performed not completely because dubbing of some track is performed by normal speed dubbing. However, if it is considered to perform high speed dubbing intentionally while a recording result which provides conspicuous interpolation noise and is not good in sound quality is submitted, then even if, for example, upon practical application, it is obliged to perform normal speed dubbing for several tunes when it is tried to perform dubbing of ten and several tunes, this does not make a significant obstruction to the merit of high speed dubbing, that is, dubbing in shorter time.

Particularly with regard to a CD, since it is driven to rotate according to the CLV, the speed of rotation of the CD increases toward the inner circumferential side of the CD. In other words, there is a situation that the reproduction operation of the CD is inclined to become unstable toward the inner circumferential side. Therefore, in practical use, if it is assumed that normal speed dubbing is performed, then the possibility is high that the reproduction operation when the inner circumference side of the CD is reproduced may be liable to become unstable. However, since the reproduction operation is stabilized on the outer circumference side, double speed dubbing can be continued.

Further, if it is tried to perform high speed dubbing while generation of interpolation noise is suppressed, then it is necessary to increase the speed of the system clock in response to the double speed in order to reinforce the processing capacity as described also in the description of the prior art. Therefore, increase of the cost arising from such reinforcement of the processing capacity cannot be avoided. The recording and reproduction apparatus of the present embodiment can eliminate also the problem of such increase in cost as just described.

5-2. Processing Operation

Processing operation for realizing the dubbing operation of the recording and reproduction apparatus described hereinabove with reference to FIG. 6 is illustrated in a flowchart of FIG. 7. The processing illustrated in FIG. 7 is executed by cooperation of the system controller 21 and the MD controller 11.

Referring to FIG. 7, in the processing illustrated, for example, if an operation for starting double speed dubbing is performed by an operation of the operation section 19 by a user, then the system controller 21 and the MD controller 11 control reproduction operation of the CD section and recording operation of the MD section so that double speed dubbing may be started in step S101.

Then in step S102, the system controller 21 discriminates whether or not the pulse width detection signal DT has the H level.

If the pulse width detection signal DT is in a L level state and consequently a negative result is obtained in step S102, then the double speed dubbing is continued as it is in step S113.

Then in step S114, the system controller 21 discriminates whether or not the dubbing should be ended (which corresponds to a case wherein reproduction of the CD comes to an end or recording for the entire recording area of the MD is completed). If a negative result is obtained in step S114, then the processing returns to step S102.

In short, as long as the L level state of the pulse width detection signal DT continues, double speed dubbing is performed until it comes to an end.

On the other hand, if the pulse width detection signal DT has the H level and consequently an affirmative result is obtained in step S102, then the processing advances to step S103.

In step S103, the system controller 21 and the MD controller 11 execute control so that the CD section may be put into a PLAY pause state and the MD section may be put into a REC pause state.

Then in next step S104, the system controller 21 on the CD section causes the optical head 32 to access the starting position (start address) of a current track for which reproduction has been performed till then. After the accessing is completed, the system controller 21 executes control so that the CD section may enter a PLAY pause state again. Meanwhile, the MD controller 11 on the MD section executes control so that the optical head 3 and the magnetic head 6a may access the recording starting position (start address) of a current track for which recording has been performed till then and then the MD section may enter a REC pause state.

Here, in order for the MD section to realize accessing of the optical head 3 and the magnetic head 6a to the recording starting position (start address) of the current track as described above, the MD controller 11 must be able to recognize the recording starting position of the current track.

To this end, for example, as described hereinabove, contents of the U-TOC read out from the MD 90 and stored, for example, in the buffer memory 13 should be successively updated in accordance with the progress of recording. In particular, before recording of a certain track is to be started, the start address of the track for which recording should be performed should be written into a slot of the management table section which is designated by the pointer of the correspondence table indication data section for the track. Then, upon accessing, the start address should be referred to from the U-TOC and accessed.

After the processing in step S104 comes to an end in such a manner as described above, the processing advances to step S105.

In step S105, the system controller 21 of the CD section changes the setting of the reproduction mode from the double speed mode to the normal speed mode. Meanwhile, the MD controller 11 of the MD section changes the setting of the recording mode from the double speed mode to the normal speed mode similarly.

After the reproduction mode and the recording mode for the normal speed are set by the processing in step S105 described above, the processing advances to step S106.

In step S106, the system controller 21 executes control processing to cancel the PLAY pause state of the CD section while the MD controller 11 executes control processing to cancel the REC pause state of the MD section in synchronism with the cancellation of the PLAY pause state of the CD section. Then in step S107, normal speed reproduction is executed by the CD section side, and normal speed recording synchronized with the normal speed reproduction of the CD section is executed on the MD section. In short, normal speed dubbing is executed.

The normal speed dubbing executed in step S107 is continued until the system controller 21 discriminates in next step S108 that reproduction of the current track of the CD section comes to an end. If it is discriminated in step S108 that the reproduction of the current track comes to an end, then the processing advances to step S109.

In step S109, the system controller 21 discriminates whether or not the dubbing should be ended with the ending of the dubbing of the track according to the normal speed till then. If it is discriminated by the system controller 21 and the MD controller 11 that the dubbing should not be ended because a track to be dubbing recorded (a track to be reproduced from the CD) remains and besides the MD has some remaining recording time, then the processing advances to step S110.

In step S110, the system controller 21 and the MD controller 11 execute control so that the CD section may enter a PLAY pause state and the MD section may enter a REC pause state. Then in next step S111, the system controller 21 executes control so that the CD section may enter a double speed reproduction mode and the MD controller 11 executes control so that the MD section may enter a double speed recording mode.

Then, after the processing in step S111 is completed, the PLAY pause state of the CD section side and the REC pause state of the MD section side are cancelled in next step S112. Consequently, in the CD section, reproduction beginning with the track next to the track which has been reproduced in preceding step S107 is started at the double speed under the control of the system controller 21. Similarly, in the MD section, recording for new tracks next to the track for which recording has been performed in preceding step 9107 is executed under the control of the MD controller 11. In short, double speed dubbing for the next track is started newly. Then, the processing returns to step S102.

Then, if the system controller 21 discriminates in step S114 or S109 described hereinabove that the dubbing comes to an end, then the reproduction operation of the CD section and the recording operation of the MD section are ended, thereby ending the routine.

By the way, as well known in the art, CD systems usually have a special reproduction mode such as a program reproduction mode or a shuffle reproduction mode. In the program reproduction mode, reproduction is performed in a reproduction order of tracks selectively designated by an operation of a user. In the shuffle reproduction mode, a track number to be reproduced is designated at random, for example, based on random numbers generated internally, and track reproduction is performed in accordance with the thus designated track number.

While, in the example of the high speed dubbing operation of the recording and reproduction apparatus of the embodiment described above with reference to FIG. 6 and FIG. 7, the CD section reproduces four tracks having consecutive track numbers from the first track to the fourth track, the high speed dubbing operation of the recording and reproduction apparatus of the present embodiment can be applied also where reproduction according to, for example, such a special reproduction mode as described above is performed by the CD section.

Further, while it is described that, in the recording and reproduction apparatus of the present embodiment, the double speed is set for high speed dubbing and the normal speed CLV is set for accessing, for example, the speed for high speed dubbing may be set to a multiple speed higher than the double speed if the reliability of the apparatus is maintained. Further, also the rotational driving speed of the disk upon accessing is not limited to the normal speed, and it may be reduced to a required rotational speed with which tracking servo pulling-in can be executed stably as a performance of the apparatus.

Further, while, in the recording and reproduction apparatus of the present embodiment described above, if occurrence of an error is detected upon high speed dubbing, the accessing positions are returned to the starting positions of current tracks for which reproduction and recording have been performed upon occurrence of the error, this is based on the presupposition that skipping or overlapping of recording sound should be avoided because object data of the recording and reproduction apparatus is audio data for which continuity in time is required. Accordingly, as a concept of the present invention, the accessing positions need not necessarily be returned to the starting positions of tracks, but may be returned to the reproduction position and the recording position same as those before the error occurs.

Furthermore, while the recording and reproduction apparatus of the present embodiment described above is a combination apparatus which includes a CD player and an MD recorder/player and can perform dubbing, for example, an actual apparatus may additionally include some other apparatus such as a radio set or a tape cassette recorder.

Further, the apparatus which can perform dubbing is not limited to the combination of a CD player and an MD recorder/player, but may be any other combination which includes a disk drive apparatus for a disk of any other type. Accordingly, the rotational driving system is not limited to the CLV system, but the CAV system or some other system may be adopted in conformity with a disk and a disk drive apparatus which are actually applied. Further, the recording side apparatus need not necessarily be for a disk medium, but may be, for example, for a hard disk, a semiconductor memory, a magnetic memory, an optical memory or the like.

While a preferred embodiment of the present invention has been described using specific terms, such description is for illustrative purposes only, and it is to be understood that changes and variations may be made without departing from the spirit or scope of the following claims.

What is claimed is:

1. A recording and reproduction apparatus which includes a reproduction section for reading out information recorded on a disk-type first recording medium, and a recording section for recording the information read out by said reproduction section onto a second recording medium, comprising:

rotational driving means for rotationally driving the first recording medium at a first rotational speed;

reproduction head means for reading out the information recorded on the first recording medium rotationally driven by said rotational driving means;

feeding means for feeding said reproduction head means in order to read out the information recorded at a designated position of the first recording medium;

error detection means for detecting an error state of the information read out from the first recording medium by said reproduction head means;

feeding control means for controlling said feeding means so that, when an error is detected by said error detection means, said reproduction head means may be fed to a reproduction position preceding to a reproduction position of the first recording medium at which the error is detected; and rotational driving control means for controlling said rotational driving means so that, after said reproduction head means is fed to the preceding reproduction position under the control of said feeding control means, the first recording medium rotationally driven by said rotational driving means may be rotated at a second rotational speed lower than the first rotational speed.

2. A recording and reproduction apparatus according to claim 1, further comprising:

recording means for recording information onto the second recording medium;

accessing control means for controlling an accessing position of said recording means in order to record the information at a designated position of the second recording medium; and recording control means for controlling said accessing control means so that, when an error is detected by said error detection means, the information may be recorded beginning with a position of the second recording medium corresponding to the preceding reproduction position of the first recording medium.

3. A recording and reproduction apparatus according to claim 1, further comprising:

second rotational driving means for rotationally driving the second recording medium at a third rotational speed;

recording head means for recording the information onto the second recording medium rotationally driven by said second rotational driving means;

second feeding means for feeding said recording head means in order to record the information at a designated position of the second recording medium;

second feeding control means for controlling said second feeding means so that, when an error is detected by said error detection means, said recording head means may be fed to a position of the second recording medium corresponding to the preceding position of the first recording medium; and second rotational driving control means for controlling said second rotational driving means so that, after said recording head means is fed to the position corresponding to the preceding reproduction position under the control of said second feeding control means, the second recording medium rotationally driven by said second rotational driving means may be rotated at a fourth rotational speed lower than the third rotational speed.

4. A recording and reproduction apparatus according to claim 1, wherein the information recorded on the first recording medium is managed in a unit of a program, and the preceding reproduction position is a reproduction starting position of a program which is reproduced upon detection of an error by said error detection means.

5. A recording and reproduction apparatus according to claim 4, wherein the information is recorded in a unit of a program onto the second recording medium, and the position of the second recording medium corresponding to the preceding reproduction position is a recording starting position of a program which is recorded upon detection of an error by said error detection means.

6. A recording and reproduction apparatus according to claim 1, wherein said rotational driving control means controls said rotational driving means so that, after said reproduction head means is fed to the preceding reproduction position under the control of said feeding control means, the first recording medium which is being rotationally driven at the first rotational speed higher than a normal rotational speed which is the second rotational speed may thereafter be rotated at the normal second rotational speed.

7. A recording and reproduction apparatus according to claim 3, wherein said second rotational driving control means controls said second rotational driving means so that, after said recording head means is fed to the position corresponding to the preceding reproduction position under the control of said second feeding control means, the second recording medium which is being rotationally driven at the third rotational speed higher than a normal rotational speed which is the fourth rotational speed may thereafter be rotated at the normal fourth rotational speed.

8. A recording and reproduction apparatus according to claim 1, wherein said error detection means detects an error based on a result of error correction of the information read out from the first recording medium.

9. A recording and reproduction apparatus according to claim 4, wherein said rotational driving control means controls said rotational driving means so that, after the program of the first recording medium is reproduced at the fourth rotational speed, upon reproduction of a next program, the rotational speed of the first recording medium may be returned to the first rotational speed.

10. A recording and reproduction apparatus according to claim 1, wherein the first recording medium is an optical disk.

11. A recording and reproduction apparatus according to claim 1, wherein the second recording medium is a magneto-optical disk.

12. A recording and reproduction apparatus according to claim 1, wherein the second recording medium is a semiconductor memory.

13. A recording and reproduction apparatus according to claim 1, wherein the second recording medium is a magnetic disk.

14. A recording and reproduction apparatus according to claim 1, wherein said feeding means feeds said reproduction head means in a radial direction of the disk-type first recording medium.

15. A recording and reproduction apparatus according to claim 1, wherein said feeding control means and said rotational driving control means are formed as a single control means.

16. A reproduction apparatus for reading out information recorded on a disk-type recording medium, comprising:

rotational driving means for rotationally driving the disk-type recording medium at a first rotational speed;

reproduction head means for reading out the information recorded on the disk-type recording medium rotationally driven by said rotational driving means;

feeding means for feeding said reproduction head means in order to read out the information recorded at a designated position of the disk-type recording medium;

error detection means for detecting an error state of the information read out from the disk-type recording medium by said reproduction head means;

feeding control means for controlling said feeding means so that, when an error is detected by said error detection means, said reproduction head means may be fed to a reproduction position preceding to a reproduction position of the disk-type recording medium at which the error is detected; and rotational driving control means for controlling said rotational driving means so that, after said reproduction head means is fed to the preceding reproduction position under the control of said feeding control means, the disk-type recording medium rotationally driven by said rotational driving means may be rotated at a second rotational speed lower than the first rotational speed.

17. A reproduction apparatus according to claim 16, wherein the information recorded on the disk-type recording medium is managed in a unit of a program, and the preceding reproduction position is a reproduction starting position of a program which is reproduced upon detection of an error by said error detection means.

18. A reproduction apparatus according to claim 16, wherein said rotational driving control means controls said rotational driving means so that, after said reproduction head means is fed to the preceding reproduction position under the control of said feeding control means, the disk-type recording medium which is being rotationally driven at the first rotational speed higher than a normal rotational speed which is the second rotational speed may thereafter be rotated at the normal second rotational speed.

19. A reproduction apparatus according to claim 16, wherein said error detection means detects an error based on a result of error correction of the information read out from the disk-type recording medium.

20. A reproduction apparatus according to claim 17, wherein said rotational driving control means controls said rotational driving means so that, after the program of the disk-type recording medium is reproduced at the second rotational speed, upon reproduction of a next program, the rotational speed of the disk-type recording medium may be returned to the first rotational speed.

21. A reproduction apparatus according to claim 16, wherein the disk-type recording medium is an optical disk.

22. A reproduction apparatus according to claim 16, wherein said feeding means feeds said reproduction head means in a radial direction of the disk-type recording medium.

23. A reproduction apparatus according to claim 16, wherein said feeding control means and said rotational driving control means are formed as a single control means.

24. A recording and reproduction method for reading out information recorded on a disk-type first recording medium and recording the read out information onto a second recording medium, comprising:

a rotational driving step of rotationally driving the first recording medium at a rotational speed;

a feeding step of feeding reproduction head means in order to read out the information recorded at a designated position of the first recording medium;

an error detection step of detecting an error state of the information read out from the first recording medium;

a feeding control step of controlling the feeding of said reproduction head means so that, when an error is detected, said reproduction head means may be fed to a reproduction position preceding to a reproduction position of the first recording medium at which the error is detected; and a rotational driving control step of controlling the rotational driving of the first recording medium so that, after said reproduction head means is fed to the preceding reproduction position, the first recording medium rotationally driven may be rotated at another rotational speed lower than the rotational speed.

25. A reproduction method for reading out information recorded on a disk-type recording medium, comprising:

a rotational driving step of rotationally driving the disk-type recording medium at a rotational speed;

a feeding step of feeding reproduction head means in order to read out the information recorded at a designated position of the disk-type recording medium;

an error detection step of detecting an error state of the information read out from the disk-type recording medium;

a feeding control step of controlling the feeding of said reproduction head means so that, when an error is detected, said reproduction head means may be fed to a reproduction position preceding to a reproduction position of the disk-type recording medium at which the error is detected; and a rotational driving control step of controlling the rotational driving of the disk-type recording medium so that, after said reproduction head means is fed to the preceding reproduction position, the disk-type recording medium rotationally driven may be rotated at another rotational speed lower than the rotational speed.

* * * * *

UNITED STATES PATENT AND TRADEMARK OFFICE
CERTIFICATE OF CORRECTION

PATENT NO.     : 6,388,959 B1
DATED          : May 14, 2002
INVENTOR(S)    : Tadaharu Kondo It is certified that error appears in the above-identified patent and that said Letters Patent is hereby corrected as shown below:

Column 10,
Line 27, after "need" insert -- to --.

Column 13,
Line 46, change "CLK.M" to -- CLK·M --.
Lines 47-49, delete "M" and bring remainder of lines up to line 46.

Column 16,
Line 16, change "FMPTY" to -- EMPTY --.
Line 27, change "necessary" to -- necessarily --.

Column 17,
Line 66, change "truck" to -- track --.

Column 18,
Line 7, change "truck" to -- track --.

Column 21,
Line 61, change "9107" to -- S107 --.

Signed and Sealed this

Nineteenth Day of November, 2002

Attest:

JAMES E. ROGAN
Attesting Officer     Director of the United States Patent and Trademark Office